US012568031B2

(12) United States Patent
    Terbush et al.

(10) Patent No.:    US 12,568,031 B2
(45) Date of Patent:        Mar. 3, 2026

(54) APPLICATION TRANSACTION RECOMMENDATION ENGINE BASED ON ENDPOINT FLOWS

(71) Applicant: Cisco Technology, Inc., San Jose, CA (US)

(72) Inventors: Ryan Nicholas Terbush, Laguna Hills, CA (US); Jason Lo, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/442,346

(22) Filed: Feb. 15, 2024

(65) Prior Publication Data

US 2025/0168091 A1      May 22, 2025

Related U.S. Application Data

(60) Provisional application No. 63/601,079, filed on Nov. 20, 2023.

(51) Int. Cl.
    *H04L 43/062* (2022.01)
    *H04L 43/10* (2022.01)
(52) U.S. Cl.
    CPC ............ *H04L 43/062* (2013.01); *H04L 43/10* (2013.01)
(58) Field of Classification Search
    CPC .............................. H04L 43/062; H04L 43/10
    See application file for complete search history.

(56) References Cited

U.S. PATENT DOCUMENTS

| | | | | |
|---|---|---|---|---|
| 8,516,301 B2 * | 8/2013 | Beck | ..................... | G06F 11/323 |
| | | | | 714/45 |
| 9,049,126 B2 * | 6/2015 | Cheung | ................. | H04L 67/141 |
| 9,706,004 B2 * | 7/2017 | Mylarappa | .......... | G06F 11/3495 |
| 10,552,456 B2 * | 2/2020 | Brown | ................... | G06F 16/284 |
| 10,880,191 B1 * | 12/2020 | Kant | ................... | G06F 11/3006 |
| 10,928,986 B1 | 2/2021 | Dinh et al. | | |
| 11,240,126 B2 * | 2/2022 | Makwarth | ........... | H04L 41/5009 |
| 11,347,518 B2 * | 5/2022 | Jha | ........................ | H04L 43/024 |
| 11,516,269 B1 * | 11/2022 | Chang, Jr. | ............. | H04L 65/612 |
| 11,526,425 B1 | 12/2022 | Karis et al. | | |
| 11,693,761 B1 * | 7/2023 | Agarwal | ............. | G06F 16/2379 |
| | | | | 717/128 |
| 12,063,228 B2 * | 8/2024 | Sheriff | .................... | H04L 41/22 |
| 12,222,840 B1 * | 2/2025 | Karis | .................. | G06F 11/3466 |
| 2012/0260133 A1 * | 10/2012 | Beck | ..................... | G06F 11/323 |
| | | | | 714/38.1 |
| 2017/0126531 A1 * | 5/2017 | Nataraj | ............... | H04L 43/0876 |
| 2017/0222893 A1 | 8/2017 | Nataraj et al. | | |

(Continued)

*Primary Examiner* — Oanh Duong
(74) *Attorney, Agent, or Firm* — Lee & Hayes, P.C.

(57)            ABSTRACT

In one embodiment, a method comprises: evaluating, by a device while traversing a plurality of ordered telemetry spans of a given telemetry trace, whether any of the plurality of ordered telemetry spans are starting points for a respective endpoint flow that represents a possible path taken within a particular application flow; determining, by the device and based on evaluating, one or more particular endpoint flows to be included within a particular application transaction reporting structure associated with the particular application flow; and reporting, by the device, metrics corresponding to the one or more particular endpoint flows within a context of the particular application transaction reporting structure.

20 Claims, 6 Drawing Sheets

TRACE VIEW 510        EF VIEW 520        BT VIEW 530

BT Defined as EF1 and EF2

LEGEND

◯ EF 1 RULE MATCH

⟲ EF 2 RULE MATCH

500

(56)     References Cited

U.S. PATENT DOCUMENTS

| | | | |
|---|---|---|---|
| 2019/0095509 A1* | 3/2019 | Brown | G06F 16/284 |
| 2020/0167209 A1* | 5/2020 | Madhusudhan Nair | G06F 9/54 |
| 2020/0328952 A1* | 10/2020 | Makwarth | H04L 41/5051 |
| 2021/0026646 A1* | 1/2021 | Jha | G06F 9/3891 |
| 2022/0245552 A1 | 8/2022 | Ertl | |
| 2023/0156093 A1* | 5/2023 | Danyi | G06F 16/9566 |
| | | | 709/227 |
| 2023/0236810 A1* | 7/2023 | Finnigan | G06F 8/433 |
| | | | 717/154 |
| 2023/0236829 A1* | 7/2023 | Chakrabarty | G06N 3/0464 |
| | | | 717/110 |

* cited by examiner

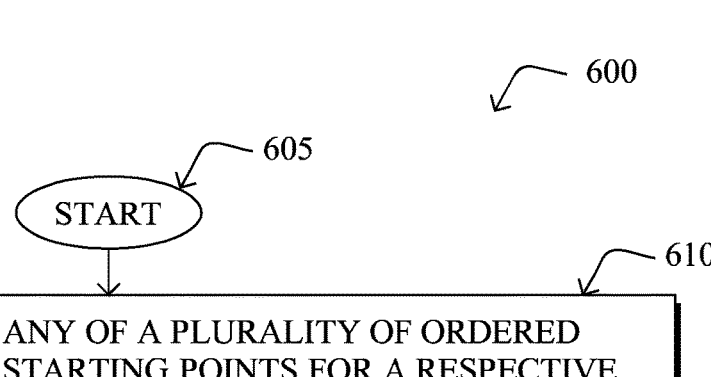

600

605

START

610

EVALUATE WHETHER ANY OF A PLURALITY OF ORDERED
TELEMETRY SPANS ARE STARTING POINTS FOR A RESPECTIVE
ENDPOINT FLOW THAT REPRESENTS A POSSIBLE PATH TAKEN
WITHIN A PARTICULAR APPLICATION FLOW

615

DETERMINE PARTICULAR ENDPOINT FLOWS TO BE INCLUDED
WITHIN A PARTICULAR APPLICATION TRANSACTION REPORTING
STRUCTURE ASSOCIATED WITH A PARTICULAR APPLICATION FLOW

620

REPORT METRICS CORRESPONDING TO THE ONE OR MORE
PARTICULAR ENDPOINT FLOWS WITHIN A CONTEXT OF THE
PARTICULAR APPLICATION TRANSACTION REPORTING STRUCTURE

625

END

FIG. 6

APPLICATION TRANSACTION RECOMMENDATION ENGINE BASED ON ENDPOINT FLOWS

RELATED APPLICATION

The present disclosure claims priority to U.S. Prov. Appl. Ser. No. 63/601,079, filed Nov. 20, 2023, for APPLICATION BUSINESS TRANSACTION RECOMMENDATION ENGINE, by Ryan Nicholas TerBush, et al., the contents of which are incorporated herein by reference.

TECHNICAL FIELD

The present disclosure relates generally to computer systems, and, more particularly, to an application transaction recommendation engine based on endpoint flows.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, an application transaction (e.g., a "business transaction") refers to the end-to-end, cross-tier processing path used to fulfill a request for a service provided by the application. For instance, in a retail application, an application transaction may correspond to user actions such as a user searching for a particular item, adding that item to their cart, beginning the checkout process, and completing payment of their purchase. Each of these actions may have associated actions within the application, such as making application programming interface (API) calls to an inventory service, a payment processing service, etc.

Today, configuring an observability platform to monitor such application transactions can be challenging, given the large number of application transactions conducted within a given application. Indeed, identifying and monitoring application transaction flows to produce meaningful insights into the operation of the application can be difficult, given the large amount of "noise" possible.

BRIEF DESCRIPTION OF THE DRA WINGS

The embodiments herein may be better understood by referring to the following description in conjunction with the accompanying drawings in which like reference numerals indicate identically or functionally similar elements, of which:

Figure 5:
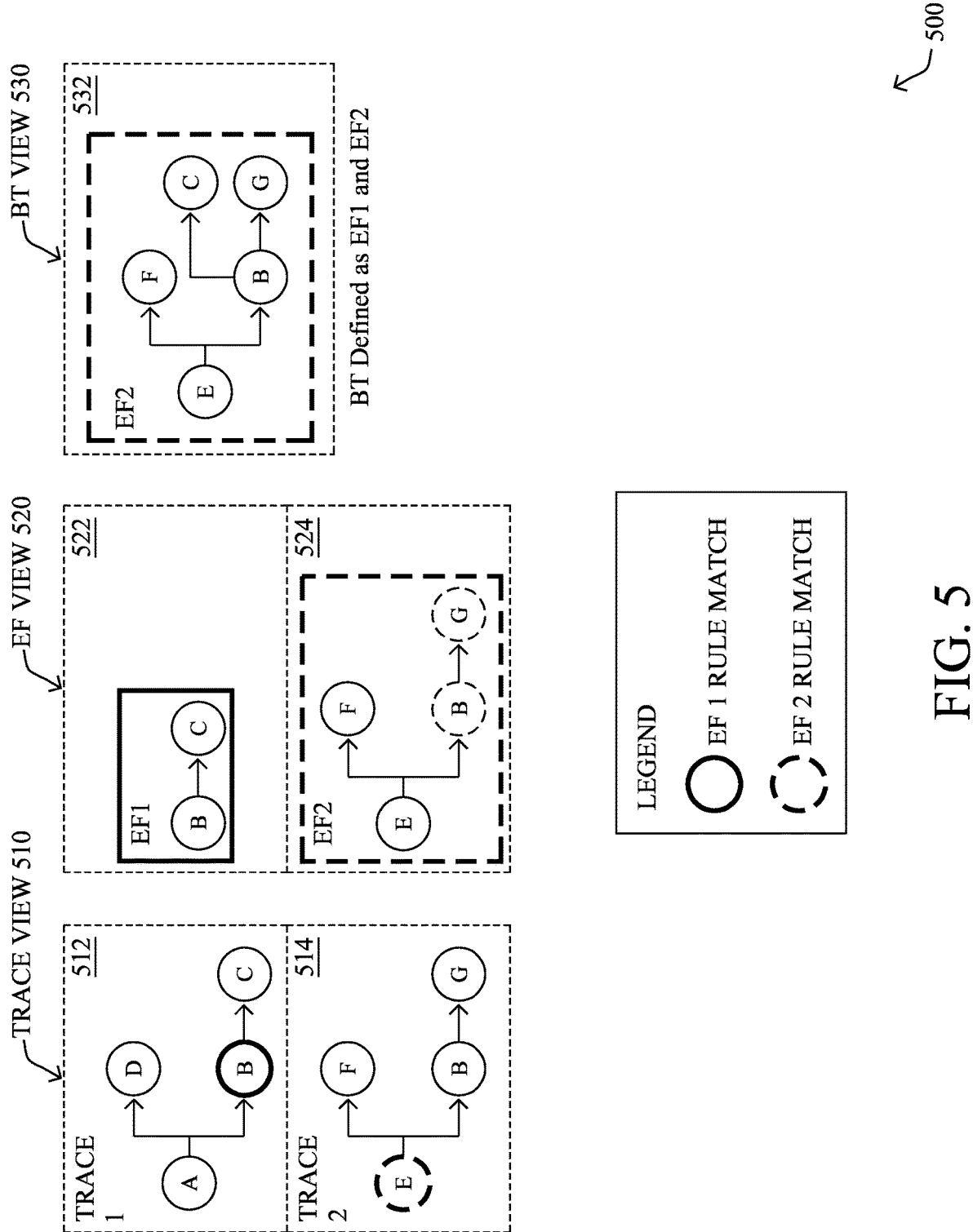

FIG. 5 illustrates an example of differences between trace views, business transaction views, and endpoint flow views based on an application transaction recommendation engine according to the techniques herein; and FIG. 6 illustrates an example simplified procedure for an application transaction recommendation engine based on endpoint flows in accordance with one or more implementations described herein.

DESCRIPTION OF EXAMPLE EMBODIMENTS

Overview

According to one or more embodiments of the disclosure, techniques herein provide for an application transaction (e.g., a business transaction) recommendation engine based on endpoint flows. In particular, the techniques herein allow for an application performance monitoring (APM) solution, such as an observability intelligence platform, to recommend application transactions to administrators, automatically.

In one embodiment, a method herein comprises: evaluating, by a device while traversing a plurality of ordered telemetry spans of a given telemetry trace, whether any of the plurality of ordered telemetry spans are starting points for a respective endpoint flow that represents a possible path taken within a particular application flow; determining, by the device and based on evaluating, one or more particular endpoint flows to be included within a particular application transaction reporting structure associated with the particular application flow; and reporting, by the device, metrics corresponding to the one or more particular endpoint flows within a context of the particular application transaction reporting structure.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computer network.
Figure 1:
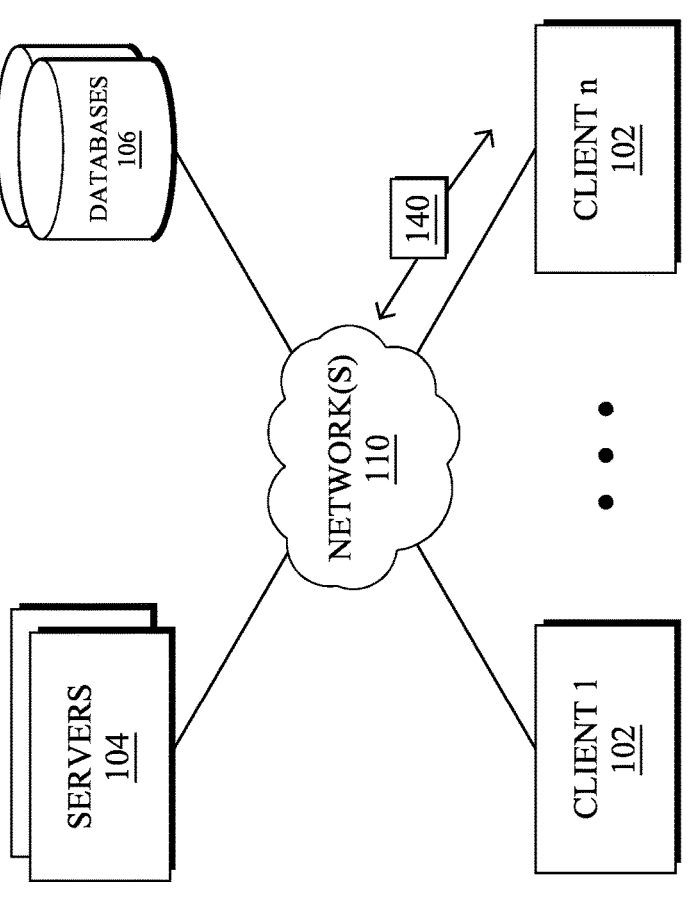

FIG. 1 is a simplified example schematic block diagram of a computing system 100 illustratively comprising any number of client devices (devices 102) (e.g., a first through $n^{th}$ client device), one or more servers (servers 104), and one or more databases (databases 106), where the devices may be in communication with one another via any number of networks (network(s) 110). The network(s) 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices (devices 102) may include any number of user devices or end point devices configured to interface with the techniques herein. For example, devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
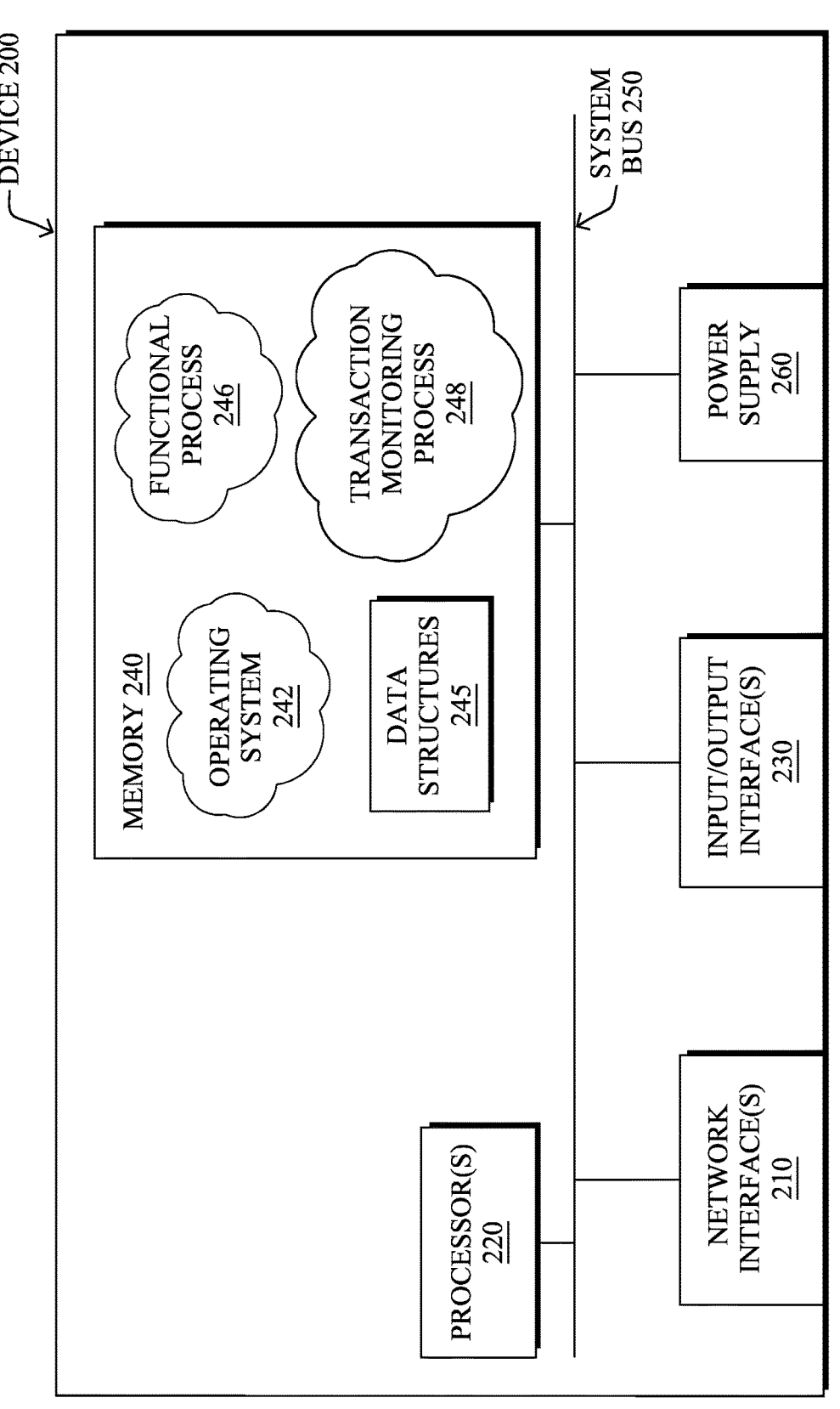
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more of network interfaces 210 (e.g., wired, wireless, etc.), at least one processor (processor 220), and a memory 240 interconnected by a system bus 250, as well as a power supply 260 (e.g., battery, plug-in, etc.).

The network interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via network interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative process, e.g., a transaction monitoring process 248, as described herein. Notably, one or more functional processes 246, when executed by processor 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Observability Intelligence Platform——

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular application transaction (or a particular type of business transaction) is being effected, and so on, whether for individual devices, a category of devices (e.g., type, location, capabilities, etc.), or any other suitable embodiment of categorical classification.

Figure 3:
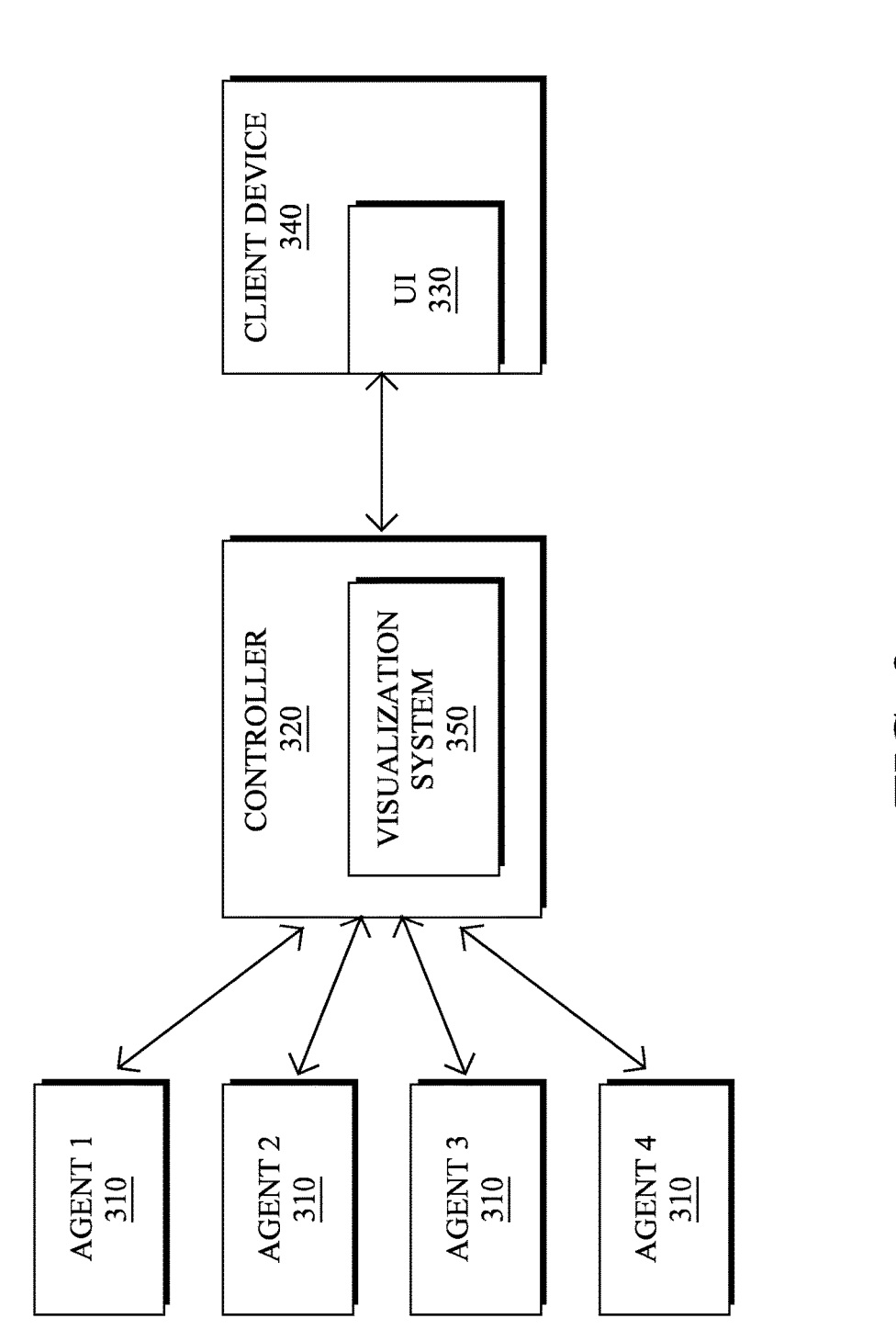
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents (agents 310) and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform. The controller 320 may serve a browser-based user interface (UI) (interface 330) that is the primary interface for monitoring, analyzing, and troubleshooting the monitored environment. Specifically, the controller 320 can receive data from agents 310 (and/or other coordinator devices), associate portions of data (e.g., topology, application transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller instance may be installed locally and self-administered.

The controllers 320 receive data from different agents (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, an application transaction (e.g., a business transaction) represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

An application transaction, in particular, is a representation of the particular service provided by the monitored environment that provides a view on performance data in the context of the various tiers that participate in processing a particular request. That is, an application transaction, which may be identified by a unique application transaction identification (ID), represents the end-to-end processing path used to fulfill a service request in the monitored environment (e.g., adding items to a shopping cart, storing information in a database, purchasing an item online, etc.). Thus, an application transaction is a type of user-initiated action in the monitored environment defined by an entry point and a processing path across application servers, databases, and potentially many other infrastructure components. Each instance of an application transaction is an execution of that transaction in response to a particular user request (e.g., a socket call, illustratively associated with the TCP layer). An application transaction can be created by detecting incoming requests at an entry point and tracking the activity associated with request at the originating tier and across distributed components in the application environment (e.g., associating the application transaction with a 4-tuple of a source IP address, source port, destination IP address, and destination port). A flow map can be generated for an application transaction that shows the touch points for the application transaction in the application environment. In one embodiment, a specific tag may be added to packets by application specific agents for identifying application transactions (e.g., a custom header field attached to a hypertext transfer protocol (HTTP) payload by an application agent, or by a network agent when an application makes a remote socket call), such that packets can be examined by network agents to identify the application transaction identifier (ID) (e.g., a Globally Unique Identifier (GUID) or Universally Unique Identifier (UUID)). Performance monitoring can be oriented by application transaction to focus on the performance of the services in the application environment from the perspective of end users. Performance monitoring based on application transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or application transaction, such as a business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

——Application Transaction Recommendation Engine——

As noted above, configuring an observability platform to monitor application transactions, such as business transactions, can be challenging, given the large number of application transactions conducted within a given application. As also noted, identifying and monitoring application transaction flows to produce meaningful insights into the operation of the application can be difficult, given the large amount of "noise" possible The techniques herein, therefore, provide for an application transaction recommendation engine based on endpoint flows. In particular, the techniques herein allow for an application performance monitoring (APM) solution, such as the illustrative observability intelligence platform above, to recommend application transactions to administrators, automatically.

Notably, the techniques herein may employ any number of machine learning techniques, such as to evaluate ingested data as described herein. In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

For reference, the following discussion is a brief primer on OpenTelemetry:

An "OpenTelemetry Trace" is defined as one or more OpenTelemetry Spans with all Spans sharing a common trace ID.

An "OpenTelemetry Span" is reported from a monitored application by an OpenTelemetry SDK or auto-instrumentation agent and includes:

A pointer to the "parent" span, the span that captures what happened immediately before this one;

A set of attributes: Key/Value pairs with information about the running program;

A status: to indicate whether the application hit an error while processing this part of the request;

A span kind: helps describe what action this span captures (call entering/leaving a service, internal to the service, etc.);

A set of resource attributes: Key/Value pairs with information about where the span came from;

A name to summarize the operation the span represents; and

A start and end time.

Specifically, a method according to one or more embodiments herein may comprise: evaluating, by a device while traversing a plurality of ordered telemetry spans of a given telemetry trace, whether any of the plurality of ordered telemetry spans are starting points for a respective endpoint flow that represents a possible path taken within a particular application flow; determining, by the device and based on evaluating, one or more particular endpoint flows to be included within a particular application transaction reporting structure associated with the particular application flow; and reporting, by the device, metrics corresponding to the one or more particular endpoint flows within a context of the particular application transaction reporting structure.

Figure 4:
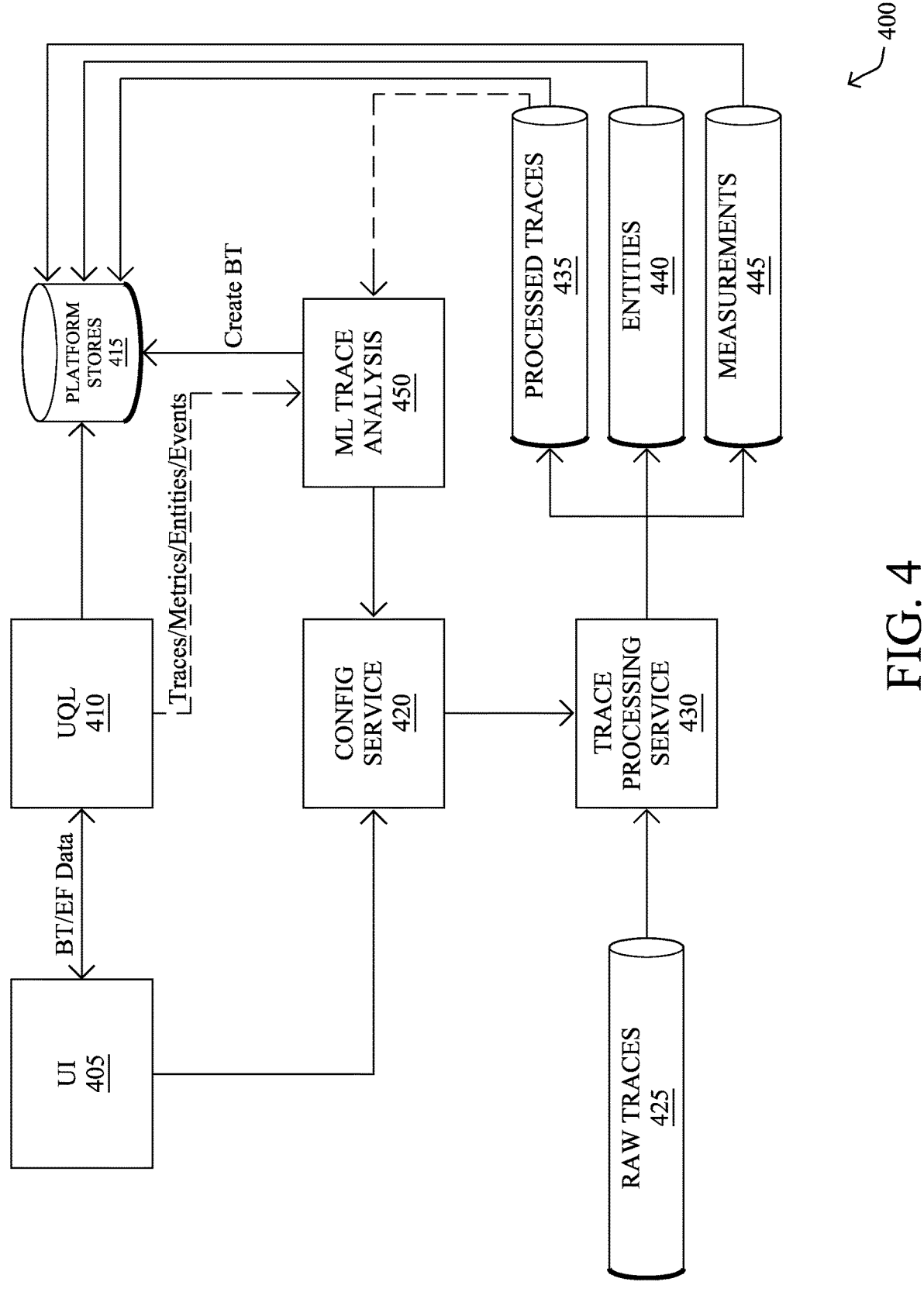
FIG. 4 illustrates an example proposed architecture for providing an application transaction recommendation engine according to the techniques herein.

Operationally, FIG. 4 illustrates an example proposed architecture 400 for providing an application transaction recommendation engine according to the techniques herein. In particular, a user interface 405 allows for communication (e.g., BT/EF data herein) with a query engine 410 (e.g., a Uniform Query Language, or UQL engine) with access to platform stores 415. The user interface also communicates with a configuration service 420 to instruct a trace processing service 430, accordingly. The trace processing service takes raw traces 425 to process them into processed traces 435, entities 440, and measurements 445, stored in platform stores 415. In one embodiment, a machine learning trace analysis engine 450 may take the results of the processed traces and certain UQL queries (traces/metrics/entities/events/), and allow for refined configurations within the configuration service 420. More particularly, as described in greater detail below, the machine learning trace analysis engine 450 may also create business transactions (BTs) or other application transactions to store in the platform stores 415, accordingly.

According to the techniques herein, an "Endpoint Flow" (EF) is an entity type representing the possible paths taken from a specific entry point into the system. An endpoint flow and/or a business transaction (BT) can consist of one or more of these flows.

According to one or more implementations of the techniques herein, the system ingests batches of spans from various sources (OpenTelemetry agents and collectors) into a backend system such as that described above. Notably, spans may be grouped by trace IDs into trace messages, and the trace messages may be processed, starting at the root, and following all parent-child links.

Each span in the traversal is evaluated as a potential starting point for an endpoint flow. (Note that endpoint flows can be nested.) In particular, evaluation criteria this can be based off of may be as follows:

Name;

The position of the span in the trace;

Span kind;

Resource attributes;

Span attributes;

Etc.

Furthermore, the rules that define conditions on these criteria can be defined by:

The system ("out of the box"/automatic rules);

Machine learning algorithms evaluating the ingested data;

A user (custom rules);

And so on.

Once any criteria is met, an endpoint flow (EF) Entity gets created. Metrics are then reported for the EF based on the status, start, and end time of the span that discovered it. All subsequent traversal of this trace will then report data in the "context" of this EF.

According to the present disclosure, traversal of traces looks for transitions between services in the trace using span attributes and span kind. These transitions are modeled as "interactions," a special class of entity that models request flow from one entity to another. All transitions are reported in the context of any application transaction that exists at that point in the traversal. Metrics for these transitions are also reported in the context of each EF entity that exists at that point.

Additionally, references to these interactions are annotated on the spans. This allows for real-time targets queries for spans relevant to an EF, or even a transition within an EF request. Interactions can be queried based on their context, allowing for visualization of the request path taken in the context of a given EF. The EF will show the aggregate flow across all traces that resulted in its discovery.

FIG. 5 illustrates an example 500 of differences between trace views, application transaction views, and endpoint flow views based on an application transaction recommendation engine according to the techniques herein. In particular, FIG. 5 illustrates trace views 510 of an example of a "trace 1" 512 from spans A-D and "trace 2" 514 from spans B and E-G. According to the techniques herein, however, the EF view 520 for trace 1 522 and trace 2 524, respectively, show a clearer contextual picture of the spans, such as based on whether the spans match certain rules or criteria for "EF1" or "EF2", accordingly. Moreover, the corresponding application transaction view 530, where the BT is defined as EF1 and EF2, shows still another picture of the combination 532 for the spans B, C, E, F, and G (where EF1 for spans B→C is now also shown within EF2).

It is important to note that endpoint flows replace business transactions herein as the atomic unit of contextual traffic modeling. Application transactions (e.g., business transactions) can therefore be expanded to be an encapsulation of one or more endpoint flows.

Moreover, the recommendation engine herein can exist at two levels:

First, a recommendation at the endpoint flow discovery level:

New flows can be identified based on attributes containing business data or request routing data;

Metric variance can help identify flows that are combined and should be split;

High cardinality flows discovered using the other rules can be combined.

Second, a recommendation at the application transaction definition level:

Identify flow requests that share some common session or client ID;

Indicate which flows are individually meaningful to promote to BT based on metric or root cause analysis data.

Notably, endpoint flows and application transactions created via these recommendations have all of the following applied thereto:

Metrics;
Span Tagging;
Health Rules; and
Alerting.

Also, all EFs and BTs that are created via this mechanism can be connected back to the algorithmic rationale for their creation via their discovery rules.

According to one or more embodiments herein, therefore, the recommendation engine derives endpoint flows from OpenTelemetry trace data and applies mechanisms and algorithms, including machine learning/artificial intelligence (ML/AI), as an abstraction of business transactions that provides a better "out-of-the-box experience" around business transactions. In particular, endpoint flows provide an additional layer of abstraction that allow for grouping and re-labeling the BT designation on top of endpoint flows. That is, business transactions exist as a rigid data structure when applied directly to the data, but with an EF as an abstracted layer, there is more flexibility with how BTs are defined. This additional flexibility may then be leveraged by advanced detection mechanisms, ML/AI, etc.

The techniques herein, therefore, provide for the discovery of EFs as a first stage to the level of customization needed for a BT recommendation engine. By redefining what a BT is to include one or more EFs (where an EF is what may have previously been discovered as a BT), the techniques herein may then proceed to discover and promote a more meaningful set of these newly defined BTs to the user. Specifically, BTs as discovered in previous methodologies may generate a large number of BTs from which it would be difficult for users to generate meaning.

Notably, a BT, as newly defined herein, can be a single EF, a small group of EFs, or a large number of EFs, depending specifically on a customer's individual application. The recommendation engine herein also brings whatever individual EFs or groups of EFs that are relevant to the forefront within a BT, so users do not have to wade through a plethora of EFs within an BT to check each individually.

As such, the techniques herein use the endpoint flows as the atomic unit that make up an application transaction (e.g., a business transaction), such that contextual information can be adding to the application transactions (e.g., BTs) based on the recommendations of how to create application transactions based on the derived endpoint flows.

FIG. 6 illustrates an example simplified procedure for an application transaction recommendation engine based on endpoint flows in accordance with one or more implementations described herein. For example, a non-generic, specifically configured device (e.g., device 200) may perform procedure 600 by executing stored instructions (e.g., the transaction monitoring process 248). The procedure 600 may start at step 605, and continues to step 610, where, as described in greater detail above, a device, while traversing a plurality of ordered telemetry spans of a given telemetry trace, evaluates whether any of the plurality of ordered telemetry spans are starting points for a respective endpoint flow that represents a possible path taken within a particular application flow.

In some implementations, the plurality of ordered telemetry spans of the particular application flow can be ingested from a plurality of sources across a computer network. Further, as described above, in some implementations, the plurality of ordered telemetry spans can comprise one or more of OpenTelemetry data, metrics, events, logs, and/or traces.

In some implementations, the device can perform the evaluation based on one or more evaluation criterion chosen from a group consisting of: a name of the respective endpoint flow; a position of a respective telemetry span among the plurality of ordered telemetry spans of the given telemetry trace; a span type associated with the respective telemetry span among the plurality of ordered telemetry spans; resource attributes associated with the respective endpoint flow; and attributes associated with the plurality of ordered telemetry spans. In addition to, or in the alternative, the device can perform the evaluation based on attributes containing business data or request routing data, or both. Further, in some implementations, the device can perform the evaluation based on applying a machine learning model to the plurality of ordered telemetry spans.

The procedure 600 continues to step 615 where, as described in greater detail above, the device determines, based on evaluating, one or more particular endpoint flows to be included within a particular application transaction reporting structure associated with the particular application flow. In some implementations, the procedure 600 can include detecting metric variance within a given endpoint flow of the one or more particular endpoint flows and/or splitting the given endpoint flow into first and second separated endpoint flows based on the metric variance. Implementations are not so limited, however, and in some implementations, the procedure 600 can include detecting high cardinality between a plurality of the one or more particular endpoint flows and/or combining the plurality of the one or more particular endpoint flows into a single combined endpoint flow.

Notably, in one embodiment, step 615 may include recommending the one or more particular endpoint flows to be included within the particular application transaction reporting structure associated with the particular application flow; and receiving confirmation of the one or more particular endpoint flows to be included within the particular application transaction reporting structure associated with the particular application flow prior to reporting the metrics corresponding to the one or more particular endpoint flows within the context of the particular application transaction reporting structure.

The procedure 600 continues to step 620 where, as described in greater detail above, the device reports metrics corresponding to the one or more particular endpoint flows within a context of the particular application transaction reporting structure.

As discussed above, the given telemetry trace may include one or more transitions to establish a plurality of trace paths for the given telemetry trace, the subsequent spans of the plurality of ordered telemetry spans may be divided into corresponding paths of the plurality of trace paths, and/or reporting the additional metrics from subsequent spans of the plurality of ordered telemetry spans may be further based on the corresponding paths of the subsequent spans.

In some implementations, the procedure can further include identifying the one or more particular endpoint flows based on common session identifiers or client identifiers within the plurality of ordered telemetry spans of the given telemetry trace. Implementations are not so limited, however, and in other implementations, the procedure 600 can further include reporting further additional metrics corresponding to a secondary endpoint flow detected within the telemetry trace within the context of the particular application transaction reporting structure.

The procedure 600 may then end in step 625.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

In some implementations, an apparatus comprising one or more network interfaces to communicate with a network, a processor coupled to the one or more network interfaces and configured to execute one or more processes, and a memory configured to store a process that is executable by the processor. In such implementations, the process comprises: evaluating, by a device while traversing a plurality of ordered telemetry spans of a given telemetry trace, whether any of the plurality of ordered telemetry spans are starting points for a respective endpoint flow that represents a possible path taken within a particular application flow; determining, by the device and based on evaluating, one or more particular endpoint flows to be included within a particular application transaction reporting structure associated with the particular application flow; and reporting, by the device, metrics corresponding to the one or more particular endpoint flows within a context of the particular application transaction reporting structure.

In still other implementations, a tangible, non-transitory, computer-readable medium can have computer-executable instructions stored thereon that, when executed by a processor on a computer, cause the computer to perform a method comprises: evaluating, by a device while traversing a plurality of ordered telemetry spans of a given telemetry trace, whether any of the plurality of ordered telemetry spans are starting points for a respective endpoint flow that represents a possible path taken within a particular application flow; determining, by the device and based on evaluating, one or more particular endpoint flows to be included within a particular application transaction reporting structure associated with the particular application flow; and reporting, by the device, metrics corresponding to the one or more particular endpoint flows within a context of the particular application transaction reporting structure.

The techniques described herein, therefore, provide for an application transaction recommendation engine based on endpoint flows. More particularly, the techniques described herein allow for application transaction monitoring with contextual flow information based on deriving endpoint flows that allow for recommendations of application transactions, such as business transactions, thus further allowing for contextual information to be associated with, and thus enhance, the application transactions, thereby giving greater visibility into the functions underlying an application transaction and aiding in troubleshooting, as described herein.

Illustratively, the techniques described herein may be performed by hardware, software, and/or firmware, (e.g., an "apparatus") such as in accordance with the transaction monitoring process 248, e.g., a "method"), which may include computer-executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the transaction monitoring process 248.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions stored thereon executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
evaluating, by a device while traversing a plurality of ordered telemetry spans of a given telemetry trace, that one or more of the plurality of ordered telemetry spans are starting points for one or more particular endpoint flows, wherein each of the one or more particular endpoint flows represents a possible path taken within a particular application flow;
determining, by the device and in response detecting the one or more starting points based on the evaluating, the one or more particular endpoint flows to be included within a particular application transaction reporting structure associated with the particular application flow; and
reporting, by the device, metrics corresponding to the one or more particular endpoint flows within a context of the particular application transaction reporting structure.

2. The method as in claim 1, further comprising:
reporting the metrics based on corresponding starting points for the one or more particular endpoint flows; and
reporting additional metrics from subsequent spans of the plurality of ordered telemetry spans following the corresponding starting points for each of the one or more particular endpoint flows within a context of a previous endpoint flow.

3. The method as in claim 2, wherein:
the given telemetry trace includes one or more transitions to establish a plurality of trace paths for the given telemetry trace,
the subsequent spans of the plurality of ordered telemetry spans are divided into corresponding paths of the plurality of trace paths, and
reporting the additional metrics from subsequent spans of the plurality of ordered telemetry spans are further based on the corresponding paths of the subsequent spans.

4. The method as in claim 1, wherein evaluating is based on one or more evaluation criterion chosen from a group consisting of: a name of the respective endpoint flow; a position of a respective telemetry span among the plurality of ordered telemetry spans of the given telemetry trace; a span type associated with the respective telemetry span among the plurality of ordered telemetry spans; resource attributes associated with the respective endpoint flow; and attributes associated with the plurality of ordered telemetry spans.

5. The method as in claim 1, further comprising:
ingesting the plurality of ordered telemetry spans of the particular application flow from a plurality of sources across a computer network.

6. The method as in claim 1, wherein evaluating is based on attributes containing business data or request routing data, or both.

7. The method as in claim 1, further comprising:
detecting metric variance within a given endpoint flow of the one or more particular endpoint flows; and
splitting the given endpoint flow into first and second separated endpoint flows based on the metric variance.

8. The method as in claim 1, further comprising:
detecting high cardinality between a plurality of the one or more particular endpoint flows; and
combining the plurality of the one or more particular endpoint flows into a single combined endpoint flow.

9. The method as in claim 1, wherein the plurality of ordered telemetry spans comprise one or more of OpenTelemetry data, metrics, events, logs, or traces.

10. The method as in claim 1, wherein evaluating is based on applying a machine learning model to the plurality of ordered telemetry spans.

11. The method as in claim 1, further comprising:
recommending the one or more particular endpoint flows to be included within the particular application transaction reporting structure associated with the particular application flow; and
receiving confirmation of the one or more particular endpoint flows to be included within the particular application transaction reporting structure associated with the particular application flow prior to reporting the metrics corresponding to the one or more particular endpoint flows within the context of the particular application transaction reporting structure.

12. The method as in claim 1, further comprising:
identifying the one or more particular endpoint flows, wherein identifying is based on common session identifiers or client identifiers within the plurality of ordered telemetry spans of the given telemetry trace.

13. The method as in claim 1, further comprising:
reporting further additional metrics corresponding to a secondary endpoint flow detected within the given telemetry trace within the context of the particular application transaction reporting structure.

14. An apparatus, comprising:
one or more network interfaces to communicate with a network;
a processor coupled to the one or more network interfaces and configured to execute one or more processes; and
a memory configured to store a process that is executable by the processor, the process comprising:
evaluating, while traversing a plurality of ordered telemetry spans of a given telemetry trace, that one or more of the plurality of ordered telemetry spans are starting points for one or more particular endpoint flows, wherein each of the particular endpoint flows represents a possible path taken within a particular application flow;

determining, in response to detecting the one or more starting points based on the evaluating, the one or more particular endpoint flows to be included within a particular application transaction reporting structure associated with the particular application flow; and reporting metrics corresponding to the one or more particular endpoint flows within a context of the particular application transaction reporting structure.

15. The apparatus as in claim 14, the process further comprising:

reporting the metrics based on corresponding starting points for the one or more particular endpoint flows; and reporting additional metrics from subsequent spans of the plurality of ordered telemetry spans following the corresponding starting points for each of the one or more particular endpoint flows within a context of a previous endpoint flow.

16. The apparatus as in claim 15, wherein:

the given telemetry trace includes one or more transitions to establish a plurality of trace paths for the given telemetry trace, the subsequent spans of the plurality of ordered telemetry spans are divided into corresponding paths of the plurality of trace paths, and the additional metrics from subsequent spans of the plurality of ordered telemetry spans are further based on the corresponding paths of the subsequent spans.

17. The apparatus as in claim 14, wherein evaluating is based on one or more evaluation criterion chosen from a group consisting of: a name of the respective endpoint flow; a position of a respective telemetry span among the plurality of ordered telemetry spans of the given telemetry trace; a span type associated with the respective telemetry span among the plurality of ordered telemetry spans; resource attributes associated with the respective endpoint flow; and attributes associated with the plurality of ordered telemetry spans.

18. The apparatus as in claim 14, wherein evaluating is based on attributes containing business data or request routing data, or both.

19. The apparatus as in claim 14, to the process further comprising:

recommending the one or more particular endpoint flows to be included within the particular application transaction reporting structure associated with the particular application flow; and receiving confirmation of the one or more particular endpoint flows to be included within the particular application transaction reporting structure associated with the particular application flow prior to reporting the metrics corresponding to the one or more particular endpoint flows within the context of the particular application transaction reporting structure.

20. A tangible, non-transitory, computer-readable medium having computer-executable instructions stored thereon that, when executed by a processor on a computer, cause the computer to perform a method comprising:

evaluating, while traversing a plurality of ordered telemetry spans of a given telemetry trace, that one or more of the plurality of ordered telemetry spans are starting points for one or more particular endpoint flows, wherein each of the particular endpoint flows represents a possible path taken within a particular application flow;

determining, in response to detecting the one or more starting points based on the evaluating, the one or more particular endpoint flows to be included within a particular application transaction reporting structure associated with the particular application flow; and reporting metrics corresponding to the one or more particular endpoint flows within a context of the particular application transaction reporting structure.

\* \* \* \* \*